United States Patent Office 3,028,658
Patented Apr. 10, 1962

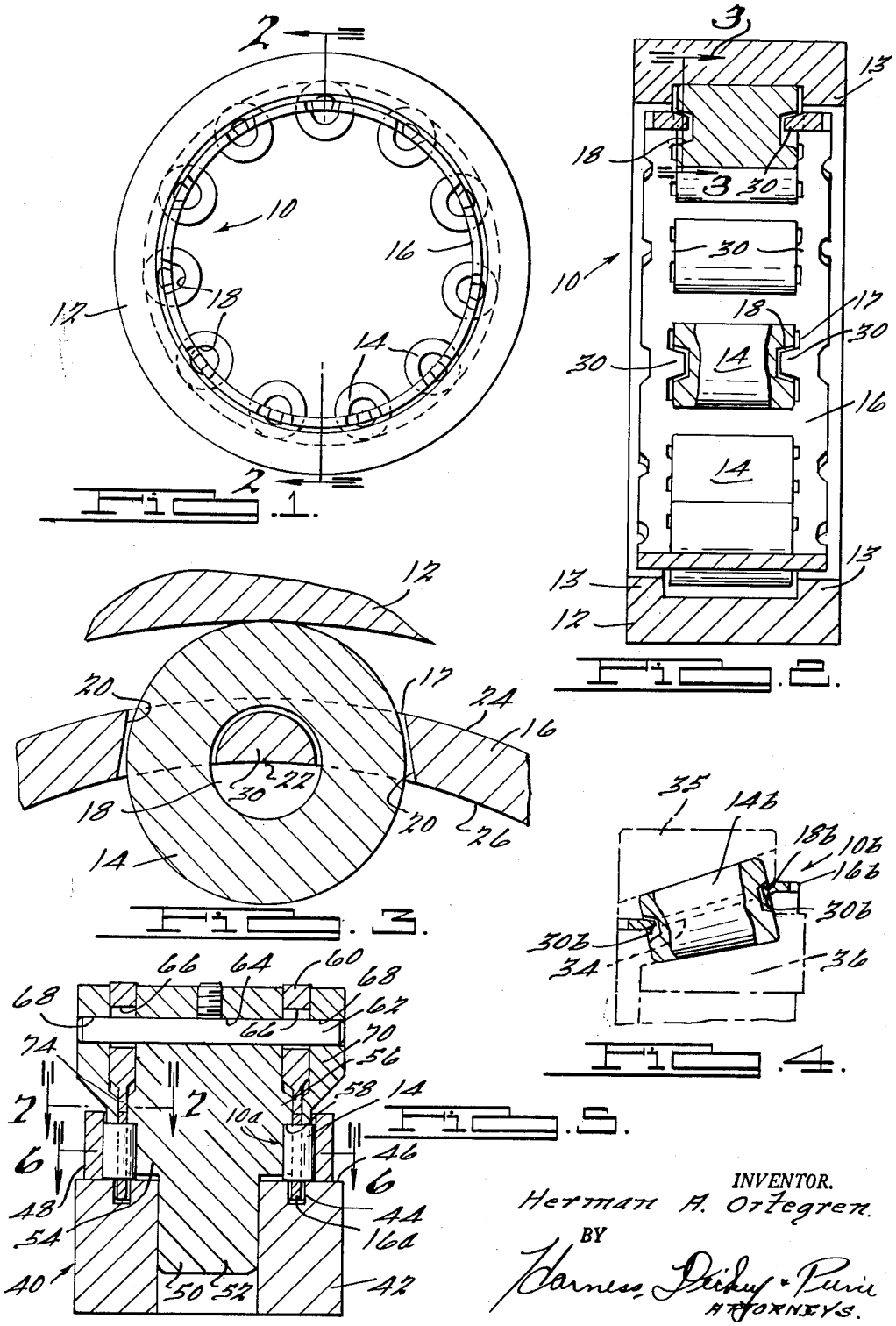

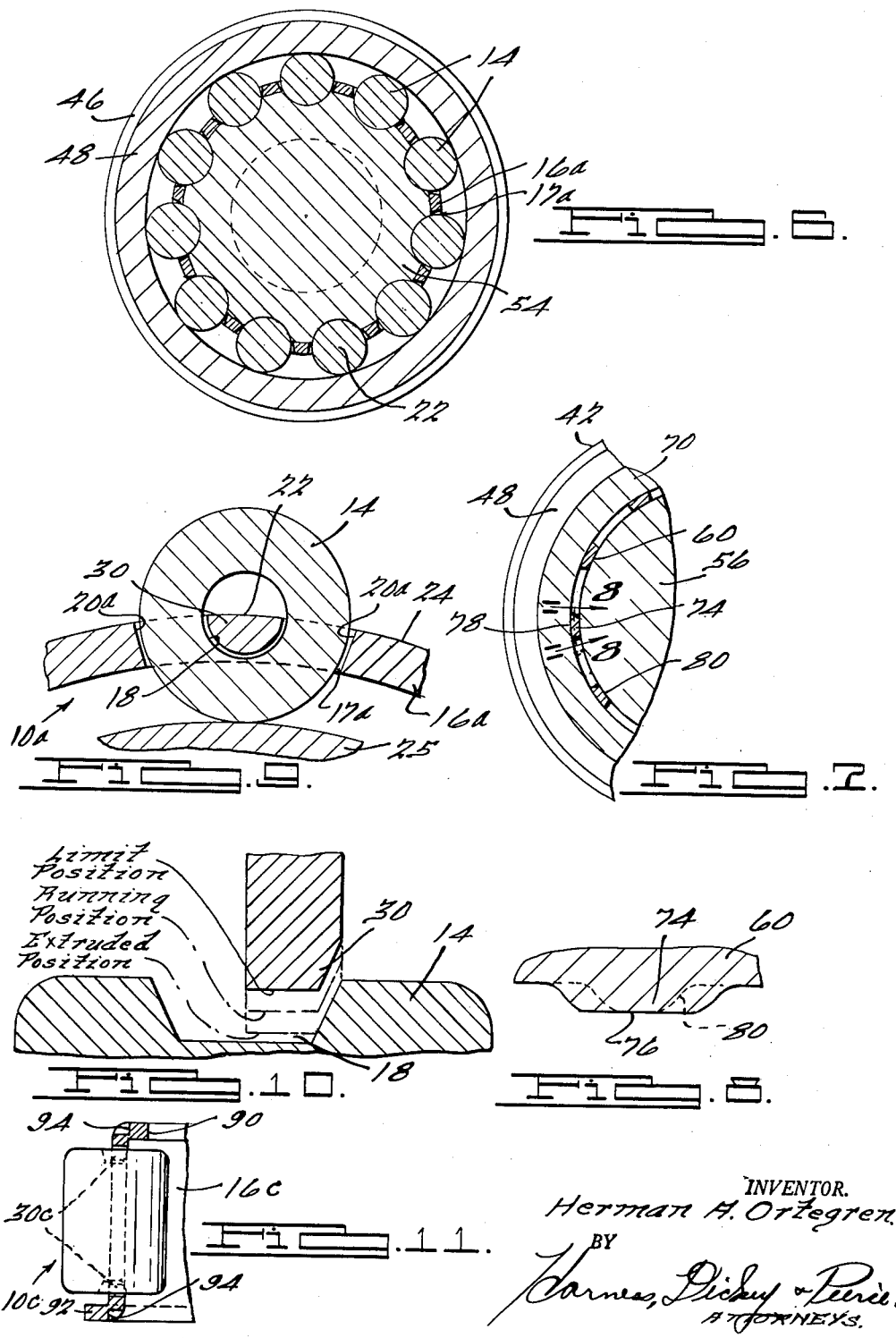

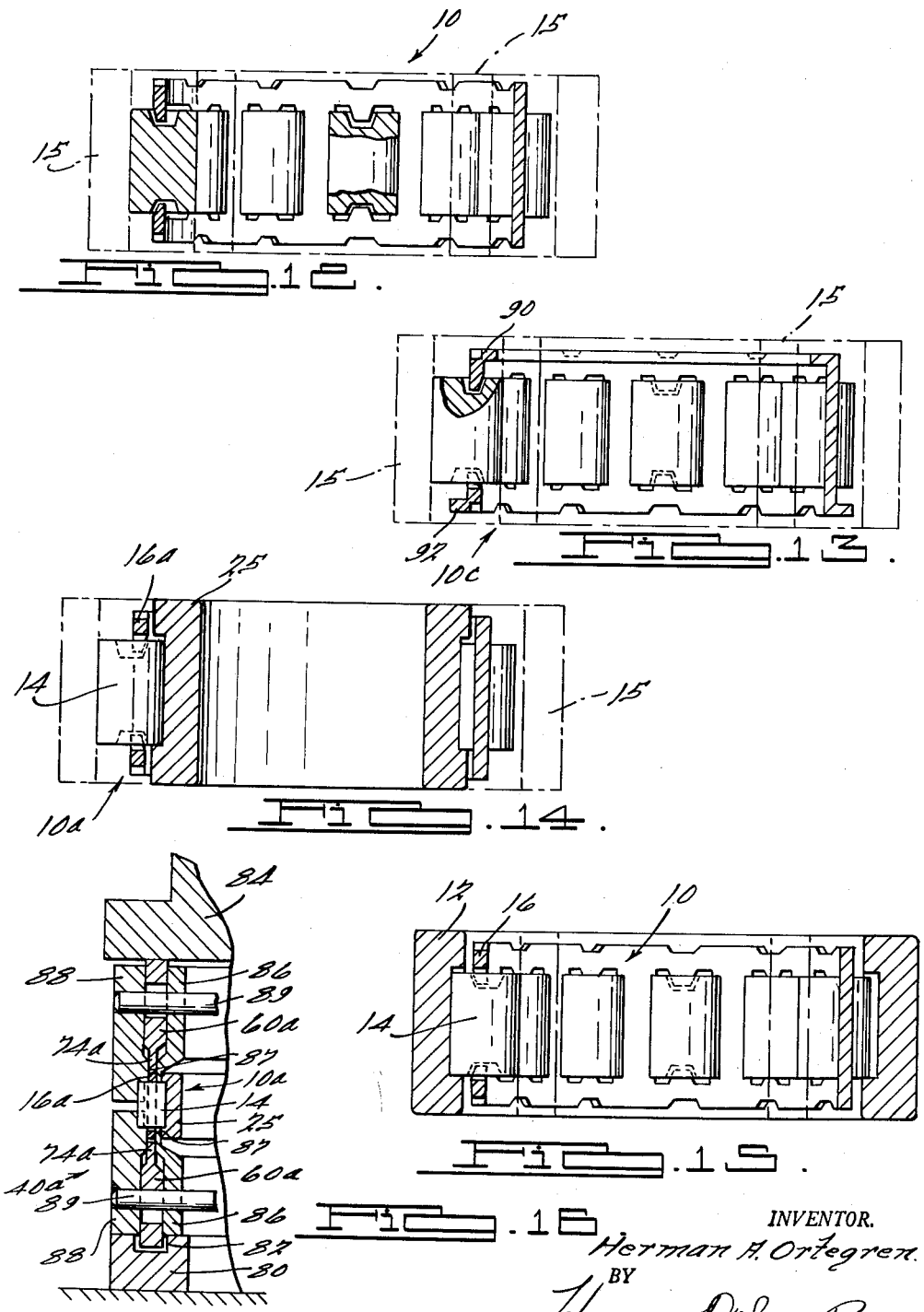

3,028,658
RETAINER RING AND ROLLER BEARING ASSEMBLY AND METHOD AND MACHINE FOR ASSEMBLING ROLLER BEARINGS
Herman A. Ortegren, Grosse Pointe, Mich., assignor to Federal-Mogul-Bower Bearings, Inc., Detroit, Mich., a corporation of Michigan
Filed Aug. 17, 1959, Ser. No. 834,088
3 Claims. (Cl. 29—148.4)

This invention relates generally to roller bearing assemblies and more particularly to an improved retainer ring and roller bearing assembly and a method of assembling the rollers and the retainer ring therefor.

The improved roller and retainer ring assembly of this invention is intended primarily for use as a journal bearing but may also be used in an inner race and roll assembly and an outer race and roll assembly. Serious problems have previously been encountered in making thin section bearings, namely, bearings with small diameter rollers because the space between the inner and outer races in which the retainer for the rollers must be installed is very narrow. Previous assemblies using retainers having rivet connected end plates have tended to be weak and flimsy because the cross sections of the end plates become very narrow. The bearing of this invention utilizes a one-piece retainer ring which is formed with slots or windows in which the rollers are positioned, and portions of the ring at opposite ends of the slots are extruded into end cavities in the rollers to make the ring and rollers an inseparable unit. The roller end cavities function as dies for the ring extrusions which under normal running conditions do not touch the rollers. Because the retainer is a one-piece ring it provides a sufficiently strong support for the rollers while occupying a small amount of space between the races. Consequently, the bearing of this invention is particularly useful as a thin section bearing.

Another object of this invention is to provide a method for assembling the rollers and the retainer ring in the assembly of this invention which utilizes the roller end cavities as dies into which retaining portions of the retainer ring are extruded to concurrently form these portions of the ring and assemble the rollers and the retainer ring.

A further object of this invention is to provide a retainer ring and roller assembly which is economical to manufacture, compact, and which is readily greased or oiled so that its useful service life is increased.

Further objects, features and advantages of this invention will become apparent from a consideration of the following description, the appended claims and the accompanying drawing in which:

FIGURE 1 is a plan view of the roller and retainer ring assembly of this invention, shown in assembly relation with an outer race;

FIG. 2 is an enlarged sectional view looking substantially along the line 2—2 in FIG. 1;

FIG. 3 is an enlarged fragmentary sectional view looking along the line 3—3 in FIG. 2;

FIG. 4 is a fragmentary sectional view, illustrated similarly to FIG. 2, showing the roller and retainer ring assembly of this invention in a tapered bearing assembly;

FIG. 5 is a vertical sectional view through a machine for assembling the roller bearing and retainer ring assembly of this invention;

FIG. 6 is an enlarged sectional view looking along the line 6—6 in FIG. 5;

FIG. 7 is an enlarged fragmentary sectional view looking along the line 7—7 in FIG. 5;

FIG. 8 is an enlarged fragmentary sectional view looking along the line 8—8 in FIG. 7;

FIG. 9 is a fragmentary sectional view, illustrated similarly to FIG. 3, showing the roller and retainer assembly of this invention in assembly relation with an inner race;

FIG. 10 is a diagrammatic view of one end of a roller and an adjacent portion of the retainer ring showing the relative positions of these elements during assembly and during use of the bearing;

FIG. 11 is a fragmentary view of a modified form of the roller and retainer ring assembly of this invention;

FIG. 12 is a sectional view of the roller and retainer ring assembly of this invention in use as a journal bearing and disposed between a pair of plain races shown in broken lines;

FIG. 13 is a sectional view, illustrated similarly to FIG. 12, showing a retainer ring having flanged edges;

FIG. 14 is a sectional view of the roller and retainer ring assembly of this invention mounted on an inner race member so as to form an inner race and roller assembly, and showing a plain outer race in broken lines;

FIG. 15 is a sectional view of the roller and retainer ring assembly of this invention mounted on an outer race member so as to form an outer race and roller assembly, and showing a plain inner race in broken lines; and FIG. 16 is a fragmentary sectional view, illustrated similarly to FIG. 5, of a modified form of machine for assembling the roller bearing and retainer ring assembly of this invention with a supporting race member therefor.

With reference to the drawing, the roller and retainer assembly of this invention, indicated generally at 10, is illustrated in FIG. 1 in assembly relation with an outer race member 12 having inwardly extending end flanges or ribs 13. The assembly 10 consists of a plurality of cylindrical rollers 14, illustrated as eleven in number and a retainer ring 16 of uniform thickness having slots or pockets 17 corresponding to the rollers 14. Each of the rollers 14 is formed at its ends with inwardly tapering axial cavities 18 for a purpose to appear later.

Each slot 17 is disposed so that it is parallel to the axis of the ring member 16 and is of a length slightly greater than the length of the corresponding roller 14. As shown in FIG. 3, the ring member 16, at the side edges 20 of each slot 17 is swaged so that the edges 20 converge in a direction radially outwardly of the ring 16. The edges 20 are spaced apart at the outer surface of the ring 16 a distance less than the diameter of a roller 14 so that the rollers 14 are movable from positions inside the ring 16 radially outwardly of the ring into the slots 17 but cannot be moved through the slots 17. Each roller 14 is movable into its corresponding slot 17 to a position in which the axis 22 of the roller 14 is located approximately on a circle 26 on the inner surface of the retainer ring 16.

The ring 16 is formed with a plurality of projections 30 which are arranged in pairs at the ends of the slots 17 and are projected inwardly of the slots 17 in a direction toward each other. Each projection 30 is of generally semi-circular shape in cross section and decreases in size in a direction toward its terminal end. Each projection 30 is of a size and shape such that during use of the assembly 10 it occupies slightly less than one-half the corresponding cavity 18, as shown in FIG. 3. As a result, when a roller 14 is positioned so that its axis 22 is on the circle 26 the projections 30 at opposite ends of the roller 14 are in a clearance relation with the roller ends.

As shown in FIGS. 1 and 3, when the assembly 10 is mounted on the flanged outer race 12 to form an outer race and roller assembly, the outer race 12 is of a diameter such that when a roller 14 is riding thereon, it has its axis 22 located approximately on the inner surface 26 of the ring 16 so that the roller is in a clearance relation with the edges 20. The shaft, plain inner race, or the like supported on the rollers 14 at a position within the ring 16 maintains the rollers 14 in a clearance relation with the projections 30.

A modified form of the assembly of this invention is indicated at 10a in FIG. 9 assembled with a flanged inner race member 25 like the outer race member 12. The assembly 10a includes a retainer ring 16a having slots 17a, like the slots 17, which are swaged so that their side edges 20a diverge in a direction radially outwardly of the ring 16a, and rollers 14 each of which is assembled with the ring 16a by moving the roller radially inwardly of the ring, from a position outside the ring. Each roller 14 is moved to a position in which it extends into the corresponding slot 17a and has its axis 22 located on a circle 24 on the outer surface of the ring member 16a. The edges 20a are spaced, at the inner surface of the ring 16a, a distance less than the diameter of the roller 14 to prevent movement of the roller through the slots 17a.

As shown in FIG. 9, the flanged inner race 25 is of a diameter such that it maintains the rollers 14 in a clearance relation with the slot edges 20a. The tubular shaft, plain outer race, or the like (not shown) supported on the rollers 14 is of a diameter such that it maintains each roller 14 in a position in which it is in a clearance relation with the projections 30 at its ends. In both the assemblies 10 and 10a the slots 17 and 17a are shaped to prevent movement of the rollers 14 in one direction out of the slots and the projections 30 prevent movement of the rollers in the opposite direction so that the assemblies can be handled as units.

A modified form of the assembly 10 is shown in FIG. 4 and designated generally by the numeral 10b. The assembly 10b is an adaptation of the assembly 10 to a tapered roller bearing assembly and consists of a retainer ring 16b, identical in all respects to the ring 16, except that it has a main portion 34 intermediate its ends which is inclined relative to the axis of the ring and is parallel to the axes of the tapered rollers 14b. The retainer ring 16b is provided with projections 30b which fit within cavities 18b at opposite ends of the tapered rollers 14b. The projections 30b correspond in shape to the projections 30 and are arranged within the cavities 18b as previously described in connection with the assemblies 10 and 10a. The assembly 10b is illustrated disposed between a member 35, which may be an outer cup, a portion of a gear supported on the assembly 10b, or the like, and an inner member 36 which may be a cone, a portion of a shaft, or the like. The projections 30b may be shaped either as shown in FIG. 3 or as shown in FIG. 9 and are located in the cavities 18b in positions corresponding to the positions shown in FIGS. 3 and 9 depending on their shape.

The assembly 10 or 10a is assembled by placing the rollers 14 and the retainer ring 16 in a machine like the one shown generally at 40 in FIG. 5. An assembly 10a is shown in the illustrated machine 40. The machine 40 has a tubular base 42 provided in its upper surface with a concentric groove 44 in which the retainer ring 16a is positioned during assembly. The lower ends of the rollers 14 are supported on the top surface 46 of the base 42 and the ring 16a is supported, at the top ends of the slots 17a, on the upper ends of the rollers 14. A roller positioning sleeve 48 supported on the top end of the base 42 encircles the rollers 14 and maintains them in a desired position with respect to the ring 16a.

A roller positioning cylinder 50 has a reduced lower end portion 52 which extends downwardly into the base 42 and an intermediate portion 54 of a larger diameter which engages the inner sides of the rollers 14 and maintains them in engagement with the positioning sleeve 48. A larger diameter upper portion 56 of the cylinder has a horizontal shoulder 58 which engages the top sides of the rollers 14 and maintains them in positions clamped between the base surface 46 and the shoulder 58. Consequently, the base 42, cylinder 50, and sleeve 48 cooperate to hold the rollers 14 in fixed positions with respect to ring 16a.

A tubular coining punch 60 is mounted on the upper end of the cylinder 50 in a concentric relation therewith for up and down movement with respect to the cylinder 50. The punch 60 is maintained in a position extending about the cylinder by a transversely extending aligning rod 62 which extends through an opening 64 in the cylinder 50, openings 66 in the punch 60, and openings 68 in a holding sleeve 70 which surrounds the punch 60. The openings 66 are considerably larger than the rod 62 to permit up and down guided movement of the punch 60 on the cylinder 50. At its lower end, the punch 60 is formed with downwardly extending fingers 74, each of which is of the shape illustrated in FIGS. 7 and 8. As shown therein, each of the fingers 74 is of a downwardly tapering shape, having a flat bottom edge 76, and is of a variable width and thickness in cross section. In other words, the radially outer side 78 of the finger 74 is wider than the radially inner side 80.

The slots 17a have their edges 20a converging in a direction radially inwardly of the ring 16a, as shown in FIG. 6, since the illustrated ring is for the assembly 10a. In such case, when the ring 16a is positioned in the groove 44 and the rollers 14 are supported on the top side of the base 42 as shown in FIG. 5, the axis 22 of each roller is disposed in substantially vertical alignment with the outer surface of the ring 16a. Consequently, when the punch fingers 74 are moved downwardly onto the upper end of ring 16a, the portions of the ring at the upper ends of the rollers 14 are extruded into the inner halves of the cavities 18 at the upper ends of the rollers 14 to thereby form the projections 30. The cylinder 50 is then withdrawn from the base 42 and the assembly 10a is turned upside down and the punch 60 is again moved downwardly to extrude the projections 30 at the opposite ends of the slots 17a.

The upper end of punch 60 extends above the upper end of cylinder 50 a predetermined distance to control the length of each projection 30. When a press is moved down into contact with the top end of the punch 60 to move the punch 60 downwardly so that the upper end thereof is level with the upper end of the cylinder 50, the projections 30 at the upper ends of the slots 17 have been formed of a predetermined length. The spacing of the upper end of the punch 60 above the cylinder 50 is adjusted so that the projections 30 are of the length illustrated in FIG. 10 and are in positions in the cavities 18 corresponding to the position labeled "extruded position." Each projection 30 is spaced slightly above the bottom end of the corresponding cavity 18 but in all other respects conforms in shape to substantially one-half of the cavity 18.

The depth of the roller end cavities 18 (FIG. 10) and the length of the projections 30 is such that when a roller 14 is moved to an extreme lengthwise position, so that it is moved as far as it will go toward the projection 30 in one end of the roller, the projection 30 at the opposite end of the roller is long enough to extend into the cavity at the opposite end of the roller and prevent the roller from falling out of the retainer ring when the bearing is being handled. Such a position for the projection 30 at the opposite end of the roller 14 is shown in FIG. 10 and labeled "limit position." The "running position" shown in FIG. 10 illustrates the normal clearance position of the projections 30 at both ends of a roller 14.

The clearance between the rollers 14 and the projections 30 is such that the rollers 14 will engage the inclined slot edges 20 (FIG. 3) and 20a (FIG. 9) before the projections 30 engage the surfaces of the roller end cavities. The slot edges 20 and 20a thus act to guide the rollers 14 so as to prevent skewing thereof.

A modified form of assembly machine, indicated generally at 40a is illustrated in FIG. 16. The machine 40a has a base 80 provided with an annular groove 82 and a vertically movable press member 84 disposed above and in a spaced relation with the base 80. A pair of punches 60a, like the punch 60 in the machine 40, are arranged so that their extruding fingers 74a are in vertical alignment and are movable in vertical directions. Each of the punches 60a is mounted for up and down movement between a pair of guiding cylinders, namely, an inner annular cylinder 86 and an outer annular cylinder 88 which are connected by a transverse pin 89. The inner ends of the cylinders 86 and 88 support the rollers 14 in vertical positions in which the roller axes are in vertical alignment with the outer surface of the ring 16a which is in vertical alignment with the extending fingers 74a. The inner ends 87 of the cylinders 86 are offset radially outwardly so that they do not interfere with the mounting of the flanged inner race member 25 on the rollers 14. It is to be understood, of course, that the inner and outer cylinders 86 and 88 can also be shaped to support the rollers 14 in positions in which the plane of the inner surface of the ring 16a coincides with the axes of the rollers 14 and the outer cylinders 88 do not interfere with the support of a flanged outer race member 12 on the rollers 14.

In the use of the machine 40a, the cylinders 88 are moved apart and the ring 16a is moved into the position shown in FIG. 16. The inner race 25 is held in a position in which its flanges are on opposite sides of the retainer ring slots 17a and the rollers 14 are moved into the slots 17a to positions in which the inner race 25 is supported on the rollers 14. The cylinders 88 are then moved to the positions shown in FIG. 16 and the press member 84 is moved downwardly to move the upper one of the punches 60a to a position in which the upper end thereof is level with the upper ends of the upper cylinders 86 and 88. This movement of the punch 60a is sufficient to form the upper projections 30 on the ring 16a of the size illustrated in FIG. 10. During such movement of the upper punch 60a, the lower punch 60a is in a clearance relation with the retainer ring 16a and projects downwardly into the groove 82. The press member 84 is then moved upwardly and the entire mechanism, consisting of the pair of punches 60a and the assembly 10a with the inner race 25 supported thereon, is turned upside down and again mounted in the machine 40a. The press member 84 is again moved downwardly to form the projections 30 at the opposite ends of the rollers 14.

Another modified form of the assembly of this invention is illustrated in FIG. 11 and designated generally at 10c. In some installations flanges on one or both ends of the retainer ring are desirable, for example, to prevent wear of an adjacent part or parts by the somewhat sharp edges of the retainer ring. The assembly 10c is designed to prevent such wear and is identical to either the assembly 10 or the assembly 10a except that it has an elongated retainer ring 16c which is provided at its ends with radial flanges 90 and 92. The flanges 90 and 92 are formed prior to engagement of a punch like the punch 60 with the ring 16c to form the projections 30c. As a result of engagement of the die with the ring 16c, notches 94 are formed in the ring at locations opposite the projections 30c. The flanges 90 and 92 are illustrated as extending in opposite directions radially of the ring 16c but it is to be understood that if desired they may extend in the same direction, either inwardly or outwardly.

The assembly 10 is illustrated in FIG. 12 in use as a journal bearing positioned between a pair of plain inner and outer race members 15. It is apparent, of course, that the assembly 10a is equally useful in such an installation. In FIG. 13, the assembly 10c is illustrated in use as a journal bearing and installed between a pair of plain inner and outer race members 15. The flanges 90 and 92 on the assembly 10c provide smooth surfaces which are engageable with other parts without causing substantial wear of such parts. In FIG. 14, the assembly 10a is illustrated in use as a roller bearing and inner race assembly. As previously explained, the inner race member 25 is assembled with the rollers 14 during assembly of the rollers 14 with the retainer ring 16a, so that the flanged inner race member 25 can be handled as a part of the unit 10a. A plain outer race 15 is shown extending about the rollers 14 in FIG. 14.

In FIG. 15, the assembly 10 is illustrated in use as a roller bearing and outer race assembly. As also previously explained, the flanged outer race member 12 is assembled with the rollers 14 concurrently with the assembly of the rollers 14 with the retainer ring 16.

It will be understood that the specific construction of the improved roller and retainer ring assembly and the method and machine for assembling the rollers and the retainer ring therefor which are herein disclosed and described are presented for purposes of explanation and illustration and are not intended to indicate limits of the invention, the scope of which is defined by the following claims.

What is claimed is:

1. The method of assembling a plurality of roller members having axial cavities at the ends thereof each of which is of a circular shape in cross section and is of a continuously decreasing diameter in a direction inwardly of the roller, with a retainer ring having spaced slots parallel to the axis thereof and corresponding in number to said rollers and with said slots having a minimum linear distance between oppositely facing axially extending edges thereof less than the diameter of said rollers, said method comprising positioning said rollers in said slots in a parallel relation thereto so that said ring at opposite ends of said rollers is in longitudinal alignment with the portions of said cavities between the axis thereof and one side thereof, and deforming said ring so that portions thereof at one end of each slot are extruded into said cavities an extent sufficient to form projections on said ring each of which extends axially a distance whereby opposite ones of said projections cooperatively prevent said rollers from falling out of said slots and each of said projections being of a volume less than the volume of a corresponding cavity and being of a shape whereby said projections are in a clearance relation with said rollers when said ring and said rollers are mounted for bearing operation.

2. The method of assembling a plurality of roller members having axial cavities at the ends thereof each of which is of a circular shape in cross section and is of a continuously decreasing diameter in a direction inwardly of the roller, with a retainer ring having spaced slots parallel to the axis thereof and corresponding in number to said rollers, and with an outer race member having integral radial flanges extending inwardly and spaced apart a distance to receive said rollers lengthwise therebetween, said method comprising forming said slots so that the width of each slot decreases in a direction radially outwardly of said retainer ring, positioning said outer race member so that it surrounds said retainer ring, moving said rollers radially outwardly of said retainer ring into said slots in a parallel relation thereto so that said ring at opposite ends of said rollers is in longitudinal alignment with the portions of said cavities between the axis thereof and the side thereof radially outward with respect to said retainer ring and so that said rollers project into the space between said race flanges, and deforming said ring so that portions thereof at one end of each slot are extruded into the cavities at one end of the rollers an extent sufficient to form projections on said ring, and subsequently extruding portions of said ring at the opposite ends of said slots into the cavities at the opposite ends of the rollers.

3. The method of assembling a plurality of roller members having axial cavities at the ends thereof each of which is of a circular shape in cross section and is of a continuously decreasing diameter in a direction inwardly of the roller, with a retainer ring having spaced slots parallel to the axis thereof and corresponding in number to said rollers, and with an inner race member having integral radial flanges extending outwardly and spaced apart a distance to receive said rollers lengthwise therebetween, said method comprising forming said slots so that the width of each slot decreases in a direction radially inwardly of said retainer ring, positioning said inner race member so that it is disposed concentrically within said retainer ring, moving said rollers radially inwardly of said retainer ring into said slots in a parallel relation thereto so that said ring at opposite ends of said rollers is in longitudinal alignment with the portions of said cavities between the axis thereof and the side thereof radially inward with respect to said retainer ring and so that said rollers project into the space between said race flanges, and deforming said ring so that portions thereof at one end of each slot are extruded into the cavities at one end of the rollers an extent sufficient to form projections on said ring, and subsequently extruding portions of said ring at the opposite ends of said slots into the cavities at the opposite ends of the rollers.

References Cited in the file of this patent

UNITED STATES PATENTS

| | | |
|---|---|---|
| 967,934 | Kirner | Aug. 23, 1910 |
| 1,137,010 | Lockwood | Apr. 27, 1915 |
| 1,250,595 | Knoth | Dec. 18, 1917 |
| 1,320,096 | Rouanet | Oct. 28, 1919 |
| 1,346,147 | Webster | July 13, 1920 |
| 1,402,071 | Huther | Jan. 3, 1922 |
| 1,404,430 | Brush | Jan. 24, 1922 |
| 1,781,886 | Scribner | Nov. 18, 1930 |
| 1,871,149 | Brown | Aug. 9, 1932 |
| 2,255,626 | Ortegren et al. | Sept. 9, 1941 |
| 2,330,741 | Potter | Sept. 28, 1943 |
| 2,655,718 | Haegele | Oct. 20, 1953 |
| 2,792,619 | Komm | May 21, 1957 |
| 2,897,581 | Cowles | Aug. 4, 1959 |